United States Patent
Matsuo et al.

(10) Patent No.: US 7,468,599 B2
(45) Date of Patent: *Dec. 23, 2008

(54) DC POWER SUPPLY AND INTEGRATED CIRCUIT DEVICE

(75) Inventors: Masahiro Matsuo, Kobe (JP); Shohichi Nitta, Toyonaka (JP); Tomonari Katoh, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/541,583

(22) Filed: Oct. 3, 2006

(65) Prior Publication Data

US 2007/0024260 A1    Feb. 1, 2007

Related U.S. Application Data

(63) Continuation of application No. 10/930,784, filed on Sep. 1, 2004, now Pat. No. 7,199,568.

(30) Foreign Application Priority Data

Sep. 1, 2003    (JP)    ............................. 2003-308460

(51) Int. Cl.
  *G05F 1/618*    (2006.01)
  *G05F 1/575*    (2006.01)
(52) U.S. Cl. ..................... 323/284; 323/283; 323/285
(58) Field of Classification Search ......... 323/223–225, 323/268, 282, 284
  See application file for complete search history.

(56) References Cited

U.S. PATENT DOCUMENTS 5,627,460 A    5/1997    Bazinet et al.
6,396,252 B1 *  5/2002    Culpepper et al. .......... 323/285
6,674,272 B2    1/2004    Hwang
6,914,419 B2    7/2005    Katayama
6,917,189 B2    7/2005    Takemura et al.

FOREIGN PATENT DOCUMENTS

JP    2003-216247    7/2003

* cited by examiner

Primary Examiner—Gary L Laxton
(74) Attorney, Agent, or Firm—Dickstein Shapiro LLP

(57) ABSTRACT

A DC power supply capable of obviating undue resetting and malfunction of CPU, immediately after starting the operation of a switching regulator, by inputting sleep signals input asynchronously during a switching cycle of the switching regulator. In the DC power supply adapted to apply a DC voltage to an output terminal by selectively switching between a first voltage from a switching regulator and a second voltage, the switching regulator includes a first switching element and a inductor serially connected between an input terminal for receiving an input voltage and an output terminal, and a second switching element for use in synchronous rectification between the first switching element and the ground, together with a first drive circuit for driving the first switching element, a second drive circuit for driving the second switching element, and a control circuit for controlling the first and second drive circuits. The control circuit is configured to control signals to the first and second drive circuits such that the second switching element is kept turned off until the first switching element is turned on when the operation of the switching regulator is initiated.

12 Claims, 6 Drawing Sheets

US 7,468,599 B2

DC POWER SUPPLY AND INTEGRATED CIRCUIT DEVICE

The present application is a continuation of U.S. patent application Ser No. 10/930,784, filed on Sep. 1, 2004, now U.S. Pat. No. 7,199,568 the disclosure of which is incorporated by reference in its entirety.

FIELD OF THE INVENTION

The invention generally relates to a DC power supply for use in electronic devices configured to apply DC voltage by selectively switching between a step-down type switching regulator and a series regulator. More particularly, the invention provides a DC power supply incorporating the switching regulator capable of obviating difficulties of overcurrent and overshoot voltage during start-up period by inputting sleep signals asynchronously during the switching cycle of the switching regulator.

This document claims priority to Japanese Patent Application No. 2003-308460, filed with the Japanese Patent Office on Sep 1, 2003, the entire content of which are hereby incorporated by reference.

BACKGROUND OF THE INVENTION

With ever increasing use of portable devices such as cellular phones and digital cameras, a non-insulated, step-down type switching regulator (hereinafter referred to as switching regulator) is utilized more often incorporated into circuits of power supply. This switching regulator is known to be highly efficient for operation and suitable for downsizing the devices.

Although the switching regulator is highly efficient for rated load, its efficiency considerably decreases when load devices are in the low current consumption mode such as at stand-by state or sleep mode since the switching regulator itself has a relatively high current consumption.

This difficulty has been obviated by terminating the operation of the switching regulator at stand-by state or sleep mode, and then either supplying battery voltages directly to the devices or switching to a series regulator which can operate at low currents.

A stabilized DC (direct current) power supply has been disclosed, which is capable of reducing power consumption by selectively switching to either switching regulator or series regulator depending on the amount of the load, for example, to which a current is supplied (for example, Japanese Laid-Open Patent Application No. 2003-216247).

A stabilized DC power supply is illustrated in FIG. 5, which is configured to terminate the operation of a switching regulator during the period at stand-by state or sleep mode, and subsequently switch to a series regulator which can operate at low current consumption.

FIG. 5 illustrates a schematic circuit diagram of the stabilized DC current supply previously known, which can operate in reduced power consumption by selectively switching to either a switching regulator 1 or a series regulator 2 depending on the magnitude of the circuit load. FIG. 6 is a timing diagram illustrating the operation of the switching regulator circuit of FIG. 5.

Referring now to FIG. 5, an inductor L1 is connected between a terminal Lx of DC/DC converter 10, which is included in the switching regulator 1, and an output terminal Vout of the switching regulator 1, and a capacitor C1 is connected between the output terminal Vout and the ground (GND).

From the output terminal Vout, power is supplied to a load. In addition, further power is supplied from an output terminal VRout of the series regulator 2. The inductor L1 and the capacitor C1 thus constitute a smoothing circuit and the capacitor C1 also serves to stabilize the output voltage VRout from the series regulator 2.

A DC power source (not shown) is connected between a power terminal Vdd of a DC-DC converter 10 and the ground GND. Similarly, a further DC power source is also connected between a power terminal Vdd of the series regulator 2 and the ground GND.

In addition, the stabilized DC current supply is controlled by a main portion (not shown) of the device as a load such that the switching regulator and the series regulator are suitably switched selectively when a portable device is in the low current consumption mode such as at stand-by state or sleep mode.

The switching regulator 1 includes at least a first switching element 11 with an input terminal for receiving source voltage Vdd, a second switching element 12 for use in synchronous rectification, the inductor L1, the capacitor C1, a Pch drive circuit 13 configured to drive the first switching element 11, and an Nch drive circuit 14 configured to drive the second switching element 12.

The Pch drive circuit 13 includes a three-input NOR circuit 13a and an inverter (INV) 13b. The Nch drive circuit 14 includes a three-input NAND circuit 14a and a further inverter 14b.

The switching regulator 1 further includes two serial resistors R1 and R2 for outputting the voltage proportional to output voltage VRout, a third switching element 21 for interrupting the current flowing through the serial resistors, a digital-to-analogue converter (DAC) 16 for generating a reference voltage Vref, an operational amplifier (AMP) 17 for amplifying the voltage difference between the voltage (A) proportional to output voltage Vout and a reference voltage Vref, an oscillator circuit (OSC) 15 for outputting triangle waves of voltage (or triangular-wave voltage), a comparator (CMP) 18 for outputting square waves based on the comparison between the output voltage from operational amplifier (AMP) 17 and the triangular-wave voltage, and a control circuit 20 configured to output control signals for controlling start/stop operation of the switching regulator 1 after receiving sleep signals (SPLb) output from the main portion of the device main (not shown).

To the three-input NOR circuit 13a and NAND circuit 14a, the output from comparator (CMP) 18 and a second start signal (DRV) from control circuit 20 are applied, respectively.

Furthermore, a voltage (NLS) is applied to the three-input NOR circuit 13a, which is also applied to the gate of the second switching element 12. In addition, a voltage (PHS) is applied to the three-input NAND circuit 14a, which is also applied to the gate of the first switching element 11.

After receiving the output from comparator (CMP) 18 and the control signal (DRV), the Pch drive circuit 13 and Nch drive circuit 14 carry out ON/OFF control operations of the first switching element 11 and second switching element 12.

As described earlier, a series regulator 2 (VR) is provided for supplying power to the load during the halt period of switching regulator 1 and an output terminal (VRout) of the series regulator 2 (VR) is connected to the output terminal of the switching regulator 1.

The operation of the circuits of FIG. 5 is now described in reference to a timing diagram included in FIG. 6.

At the interval (1) or sleep period, at which sleep signals (SLPb) are at the low level (LO), the control circuit 20 operates to set both a first start signal (ANA) used as chip enable signal and the second start signal, (DRV), (also referred to as the second start voltage or second control signal), at the high level (HI).

The first start signal (ANA) is connected to both the digital-to-analogue converter (DAC) 16 and the enabling terminal (CE) of the oscillator circuit (OSC) 15. During the period of first start signal (ANA) at HI, the operation of both circuits 15, 16 is interrupted, the digital-to-analogue converter (DAC) 16 outputs zero (0) V, and the oscillator circuit (OSC) 15 outputs a source voltage (Vdd).

At the interval (2) where the sleep signals (SLPb) are brought to HI, that is, the sleep mode is lifted and the rated mode operation is initiated, the control circuit 20 operates immediately to set the first start signal (ANA) at LO. On receiving the LO start signal, the digital-to-analogue converter (DAC) 16 operates to output the reference voltage (Vref) and the oscillator circuit (OSC) 15 outputs triangular-wave voltages.

The control circuit 20 then receives the triangular-wave voltages from the oscillator circuit (OSC) 15 and generates synchronization signals (SETb) in synchronous with the triangular-wave voltages.

Subsequently, in synchronous with the falling tail of the first synchronization signal (SETb) formed right after lifting the sleep mode, the second start signal (DRV) is brought to LO and the operation enters the interval (3).

During the period at which the second start signal (DRV) is HI at the intervals (1) and (2), this signal operates, by way of the three-input NOR circuit 13a and inverter (INV) 13b, to maintain the gate voltage (PHS) of the first switching element 11 to be HI and turn off the first switching element 11.

At the same time, this signal also operates to maintain the gate voltage (NLS) of the second switching element 12 to be LO by way of the inverter (INV) 19, three-input NAND circuit 14a, and inverter 14b, and to turn off the second switching element 12.

As a result, the switching regulator 1 remains at halt mode.

At the interval (3) where the second start signal (DRV) is at LO, the three-input NOR circuit 13a and the three-input NAND circuit 14a are both brought to open.

Since the input terminals of the three-input NOR circuit 13a and the three-input NAND circuit 14a are both connected to the output terminal of comparator (CMP) 18, square-wave voltage output from the comparator (CMP) 18 is applied to the gate (PHS) of first switching element 11 and the further gate (NLS) of second switching element 12 by way of the three-input NOR circuit 13a and the three-input NAND circuit 14a.

As a result, the switching regulator 1 initiates its operation.

During the period where the switching regulator 1 remains at halt mode, however, the output voltage (VRout) from the series regulator 2 (VR) is applied to the output terminal (Vout). In addition, the third switching element 21 is turned off during the period.

As a result, an inverted input voltage (A) of the operational amplifier (AMP) 17 is equal to the output voltage (VRout) from the series regulator 2 (VR) and higher than the reference voltage (Vref) output from digital-to-analogue converter (DAC) 16.

When the second start signal (DRV) is brought to LO, this signal is subsequently applied to the gate of third switching element 21 by way of the inverter (INV) 19. And, this signal operates to turn on the third switching element 21, couple one end of the resistor (R2) to the ground, and decrease the inverted input voltage (A) of the operational amplifier (AMP) 17.

Immediately after the second start signal (DRV) becomes LO, however, the inverted input voltage (A) of the operational amplifier (AMP) 17 still remains as LO.

As a result, the output of the comparator (CMP) 18 becomes HI.

Since the second start signal (DRV) is LO, as described earlier, the three-input NOR circuit 13a and the three-input NAND circuit 14a are both open. In addition, if the output of the comparator (CMP) 18 is also HI during this period, three inputs of the three-input NOR circuit 13a are all brought to HI, although the gate (PHS) of first switching element 11 remains LO. Whereby, the level of the gate (NLS) of second switching element 12 is altered from LO to HI.

As a result, the second switching element 12 is turned on, the output terminal is short circuited through the inductor (L1), and the voltage (Vout) of the output terminal decreases rapidly.

This gives rise to a difficulty of unintentionally resetting several devices connected to the output terminal voltage (Vout) such as a CPU included in load units or a portable device, for example.

BRIEF SUMMARY OF THE INVENTION

Accordingly, an exemplary embodiment of the present invention provides a DC (direct current) power supply capable of obviating undue resetting and malfunction of CPU, for example, which may occur immediately after starting the operation of a switching regulator included in the power supply.

Also, an exemplary method for driving the power supply is disclosed, having most, if not all, of the advantages and features of similar employed apparatuses and methods, while eliminating many of the aforementioned disadvantages.

The following description is a synopsis of only selected features and attributes of the present disclosure. A more complete description thereof is found below in the section entitled "Description of the Preferred Embodiments."

A DC power supply according to an exemplary embodiment is configured to apply a DC voltage to an output terminal, which is output from a system switched selectively between two systems, in which at least one of the two systems comprises a switching regulator.

This switching regulator includes a first switching element and an inductor serially connected between an input terminal for receiving an input voltage and an output terminal, and a second switching element for use in synchronous rectification connected between the first switching element and the ground.

In addition, the switching regulator is configured to convert the input voltage to a predetermined voltage by releasing energy, that is stored in the inductor during on-period of the first switching element, during off-period by way of the second switching element for use in synchronous rectification, and to output the predetermined voltage such that the second switching element is kept turned off until the first switching element is turned on when the operation of the switching regulator is initiated.

The DC power supply may further include a first drive circuit for driving the first switching element, a second drive circuit for driving the second switching element, and a control circuit for controlling the first and second drive circuits, in which the control circuit is configured to output a control signal to the first and second drive circuits, and to assume the control based on the control signal such that the second switching element is kept turned off until the first switching element is turned on when an operation of the switching regulator is initiated.

The control is in use for a start/stop control signal of the switching regulator in response to a sleep signal and transmitted to the first and second drive circuits by way of a latch unit.

In addition, the control signal by way of the latch unit is input to the control electrode of second switching element, in which the latch unit operates to latch a signal derived from the control signal for putting the switching regulator into a halt mode so that the second switching element is maintained in the off-state, and then the latch circuit is lifted by the signal for turning on the first switching element.

Furthermore, the DC power supply may further include
a first unit for outputting a voltage proportional to an output voltage,
a third switching element for interrupting a current flowing through the first unit during the period in sleep mode,
a reference voltage generator for generating a reference voltage,
an operational amplifier circuit for amplifying a voltage difference between the voltage proportional to the output voltage and the reference voltage,
an oscillation circuit for switching the switching regulator,
a comparator for comparing between an output voltage from the operational amplifier and another output voltage from the oscillator circuit and for outputting square waves based on the result from the comparison, and
the control circuit for outputting a control signal for assuming start/stop control of the switching regulator in response to the sleep signal,
in which an output from the comparator and the control signal from the control circuit are applied to a first drive circuit, and an output from the comparator and a signal resulted from latching the control signal from the control circuit by means of the latch unit are applied to a second drive circuit.

The latch circuit may consist of either two NOR circuits or a D flip-flop.

An exemplary method is also disclosed for driving a DC power supply configured to apply a DC voltage to an output terminal, which is output from one switched selectively between two systems.

The method includes the steps of
providing a first switching element, a second switching element, and an inductor;
forming a switching regulator as at least one of the two systems by connecting the first switching element and inductor serially between an input terminal for receiving an input voltage and an output terminal, and connecting the second switching element for use in synchronous rectification between the first switching element and the ground; and
controlling the switching regulator to convert the input voltage to a predetermined voltage and output the predetermined voltage such that the second switching element is kept turned off until the first switching element is turned on when an operation of the switching regulator is initiated.

A semiconductor integrated circuit device according to another exemplary embodiment is also disclosed for use in a DC power supply configured to apply a DC voltage to an output terminal by selectively switching between a first voltage from a switching regulator and a second voltage from a series regulator.

The integrated circuit device is formed loading several circuits such as,
a DC/DC converter unit included in the switching regulator, including
a first switching element,
a second switching element for use in synchronous rectification connected between the first switching element and the ground,
a first drive circuit for driving the first switching element,
a second drive circuit for driving the second switching element, and
a control circuit for controlling the first and second drive circuits; and
the series regulator;
in which the control circuit is configured to assume a control such that the second switching element is kept turned off until the first switching element is turned on when the operation of the switching regulator is initiated.

These and other features and advantages of the invention will be more clearly seen from the following detailed description of the invention which is provided in connection with the accompanying drawings.

DESCRIPTION OF THE PREFERRED EMBODIMENTS

In the detailed description which follows, specific embodiments of a DC power supply and a method of driving the power supply capable of obviating undue resetting and malfunction of CPU included in the power supply are provided. It is understood, however, that the present disclosure is not limited to these embodiments. For example, the use of the DC power supply disclosed herein may also be adaptable to any form of electronic circuits and systems. Other embodiments will be apparent to those skilled in the art upon reading the following description.

Figure 1:
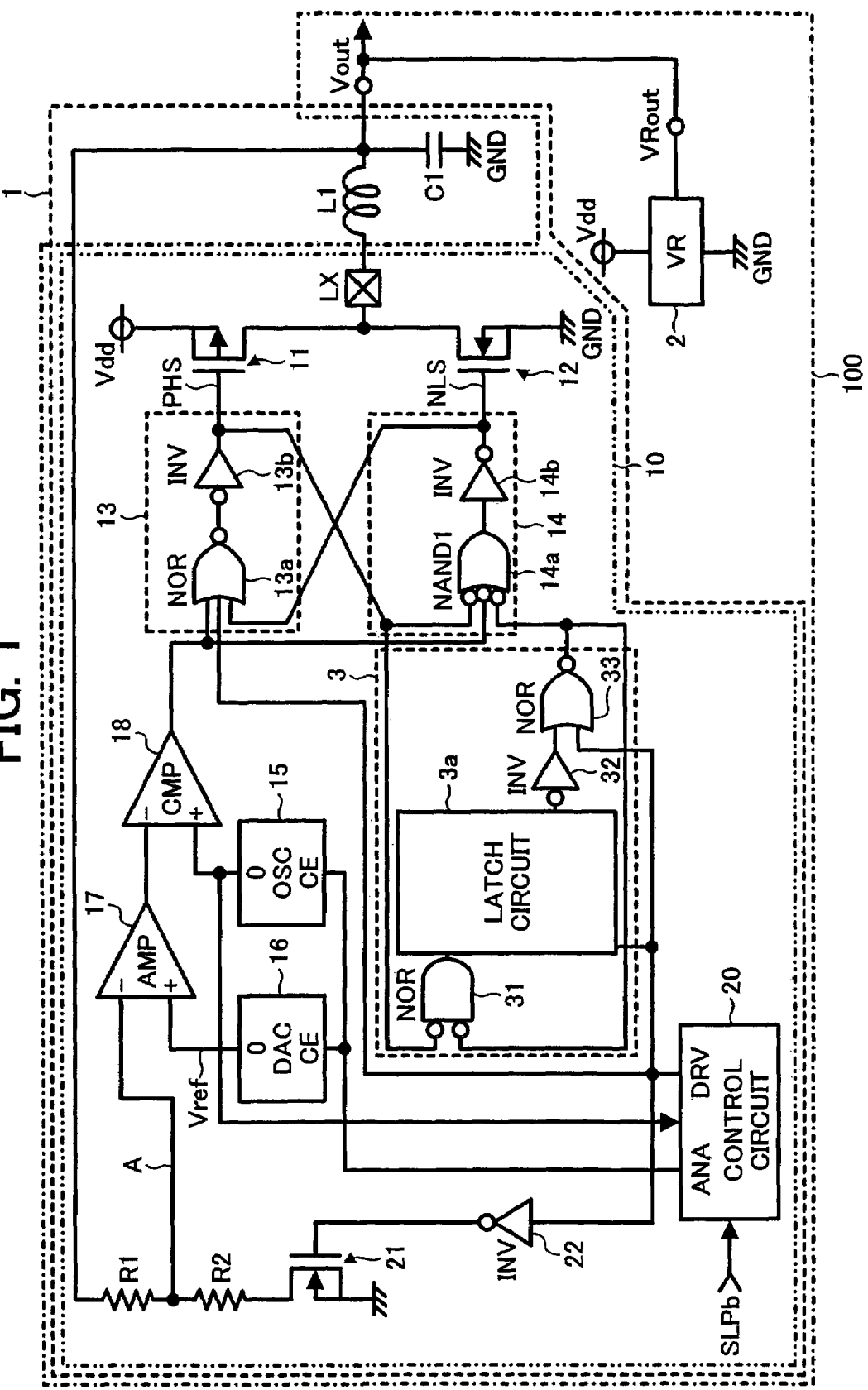
FIG. 1 is a block diagram illustrating the principal operating circuits in a DC power supply according to an exemplary embodiment of the invention.

FIG. 1 is a block diagram illustrating the principal operating circuits in a DC power supply according to an exemplary embodiment of the invention, in which the power supply is configured to terminate the operation of a switching regulator during the period at stand-by state or sleep mode, and then switch to a series regulator which can operate at low current consumption.

The components in the circuit of FIG. 1 that are similar to those of the known power supply described earlier in reference to FIG. 5, are shown with identical numerical representations and detailed description thereof is herein abbreviated.

Referring again to FIG. 1, the DC power supply according to the exemplary embodiment is configured to apply voltage to an output terminal (Vout) from one of two DC voltage supply systems, selectively switched depending on the magnitude of circuit load. In the present embodiment, one system is primarily a switching regulator 1, while the other system is a series regulator 2.

A first switching element 11 comprising a P-channel MOS and an inductor L1 is serially connected between an input terminal (i.e., the terminal to which a source voltage Vdd is applied) of DC/DC converter 10 included in a step-down type switching regulator 1 and the output terminal (Vout).

In addition, a second switching element 12 comprising an N-channel MOS for use in synchronous rectification is connected between the first switching element 11 and the ground (GND). A capacitor C1 is connected between the output terminal (Vout) and the ground (GND).

From the output terminal (Vout), power is supplied to the load. In addition, further power is also supplied from an output terminal (VRout) of the series regulator 2 to the load.

The inductor (L1) and the capacitor (C1) constitute a smoothing circuit, and the capacitor C1 serves to stabilize the output voltage VRout from the series regulator 2.

The switching regulator 1 includes a P-channel MOS drive circuit 13 for driving the first switching element 11 and an N-channel MOS drive circuit 14 for driving the second switching element 12.

The Pch drive circuit 13 includes a three-input NOR circuit 13a and an inverter (INV) 13b. The Nch drive circuit 14 includes a three-input NAND circuit 14a and a further inverter 14b.

The switching regulator 1 further includes two serial resistors R1 and R2 for outputting the voltage proportional to output voltage VRout and a third switching element 21 including N-channel MOS for interrupting the current flowing through the serial resistors during the sleep mode period.

The voltage proportional to an output voltage (Vout) is applied to one of input terminals of an operational amplifier (AMP) 17 from the serial resistors R1 and R2.

To the other input terminal of the operational amplifier (AMP) 17, is an output power from a digital-to-analogue converter (DAC) 16 for generating reference voltage Vref. The operational amplifier (AMP) 17 amplifies the voltage difference between the voltage (A) proportional to output voltage (Vout) and the reference voltage (Vref), which is output to one of the input terminals of a comparator (CMP) 18.

The comparator (CMP) 18 outputs square waves based on the comparison between the output voltage from operational amplifier (AMP) 17 and triangular-wave voltage output from an oscillator circuit (OSC) 15. Power output from the comparator (CMP) 18 is applied to the P-channel MOS drive circuit 13 and the N-channel MOS drive circuit 14.

The control circuit 20 outputs control signals for controlling start/stop operation of the switching regulator 1 after receiving sleep signals (SPLb).

The Pch drive circuit 13 and Nch drive circuit 14 carry out ON/OFF control operations of the first switching element 11 and second switching element 12.

The switching regulator 1 is configured to convert the input voltage Vdd to a predetermined voltage. This voltage conversion is achieved by releasing energy during off-period for the first switching element 11 by way of the second switching element 12 used in synchronous rectification, in which the energy is stored previously in the inductor L1 during on-period.

The control circuit 20 configured to output control signals (DRV) for controlling start/stop operation of the switching regulator 1 after receiving sleep signals (SPLb) input to the control circuit 20.

The present invention provides an improved circuit construction in the case of starting the operation of the switching regulator 1 such that the second switching element 12 remains off by suitably applying the control signals (DRV) until the first switching element 11 is turned on. To that end, in the present embodiment, the power output from P-channel MOS drive circuit 13 is held by a latch unit 3 so that the N-channel MOS drive circuit 14 is controlled.

Namely, the power output from P-channel MOS drive circuit 13 is input to a NOR circuit 31, the output from the NOR circuit 31 is latched by a latch circuit 3a, and the output from the latch circuit 3a is input to one of the input terminals of the NOR circuit 33 by way of an inverter (INV) 32. To the other input terminal of the NOR circuit 33, signals from the control signal terminal (DRV) are applied. And, the power output from the NOR circuit 33 is applied to three-input NAND circuit 14a of Nch drive circuit 14.

The control signals (DRV) are applied to a control terminal of the second switching element 12 by way of the latch unit 3, the latch unit 3 operates to latch the signals derived from control signals (DRV) for putting the step-down type switching regulator 1 into the halt mode so that the second switching element 12 is maintained in the off-state. In addition, the latch unit 3 is lifted by the signal for turning on the first switching element 11.

Therefore, when the operation of the switching regulator 1 is initiated, the second switching element 12 can be kept turned off until the first switching element 11 is turned on.

As a result, the second switching element 12 cannot be turned on unintentionally, and the decrease in power output does not take place before the operation of the switching regulator 1 is initiated. The difficulty noted previously can therefore be obviated.

The DC power supply described herein above in reference to FIG. 1 may alternatively be provided with the DC/DC converter 10 and the series regulator 2 mounted on a single semiconductor integrated circuit 100, and the inductor (L1) and the capacitor (C1) as additional external devices.

Having generally described the present invention, the following examples are provided further to illustrate preferred embodiments. This is intended to be illustrative but not to be limiting to the apparatuses or methods described herein.

EXAMPLE 1

Figure 2:
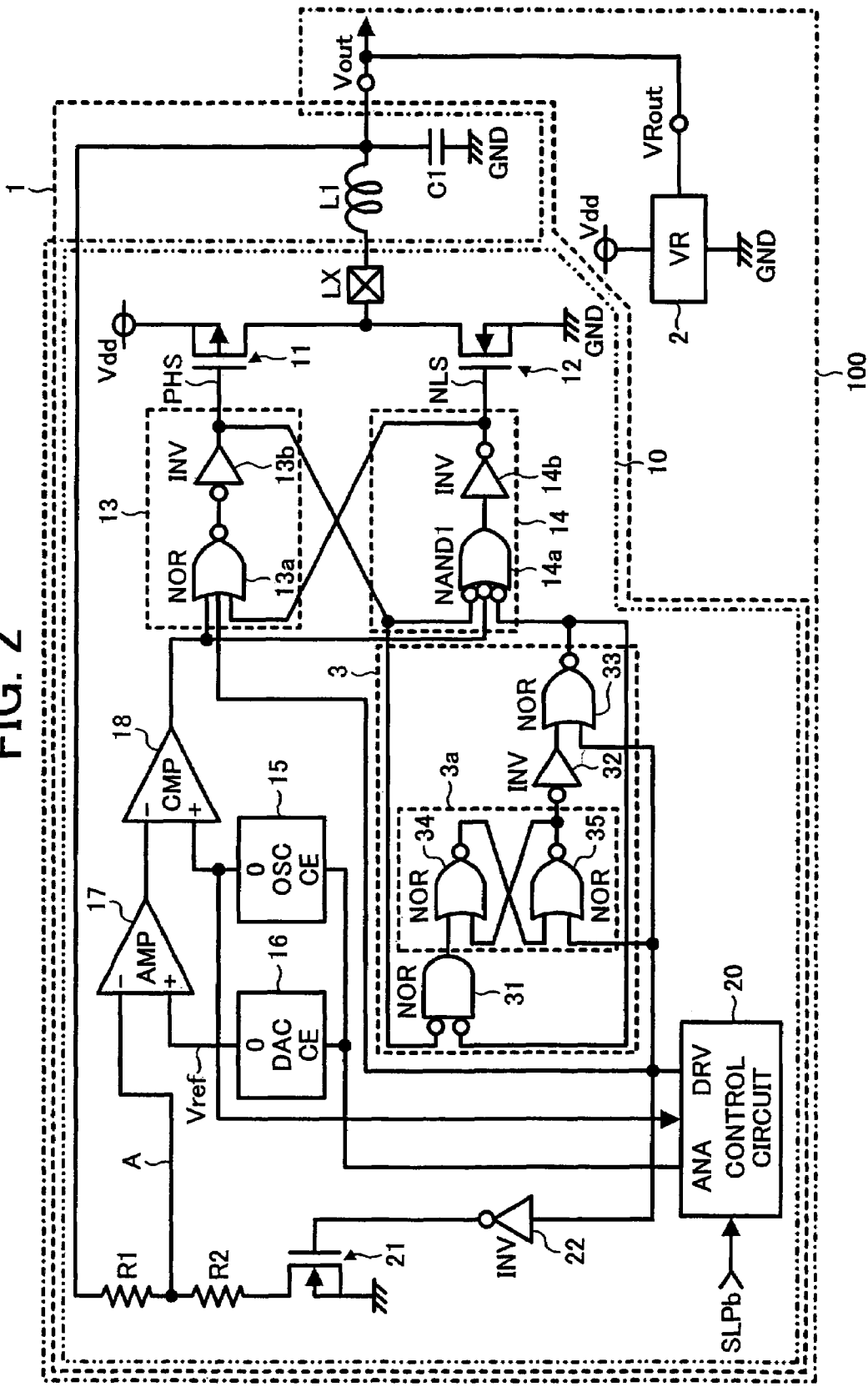
FIG. 2 is a block diagram illustrating the principal operating circuits in a DC power supply according to alternate embodiment of the invention.

FIG. 2 is a block diagram illustrating the principal operating circuits in a DC power supply according to one embodiment of the invention, in which the power supply is configured to terminate the operation of a switching regulator 1 during the period at stand-by state or sleep mode, and then switch to a series regulator 2 capable of operating at low current consumption.

Figure 3:
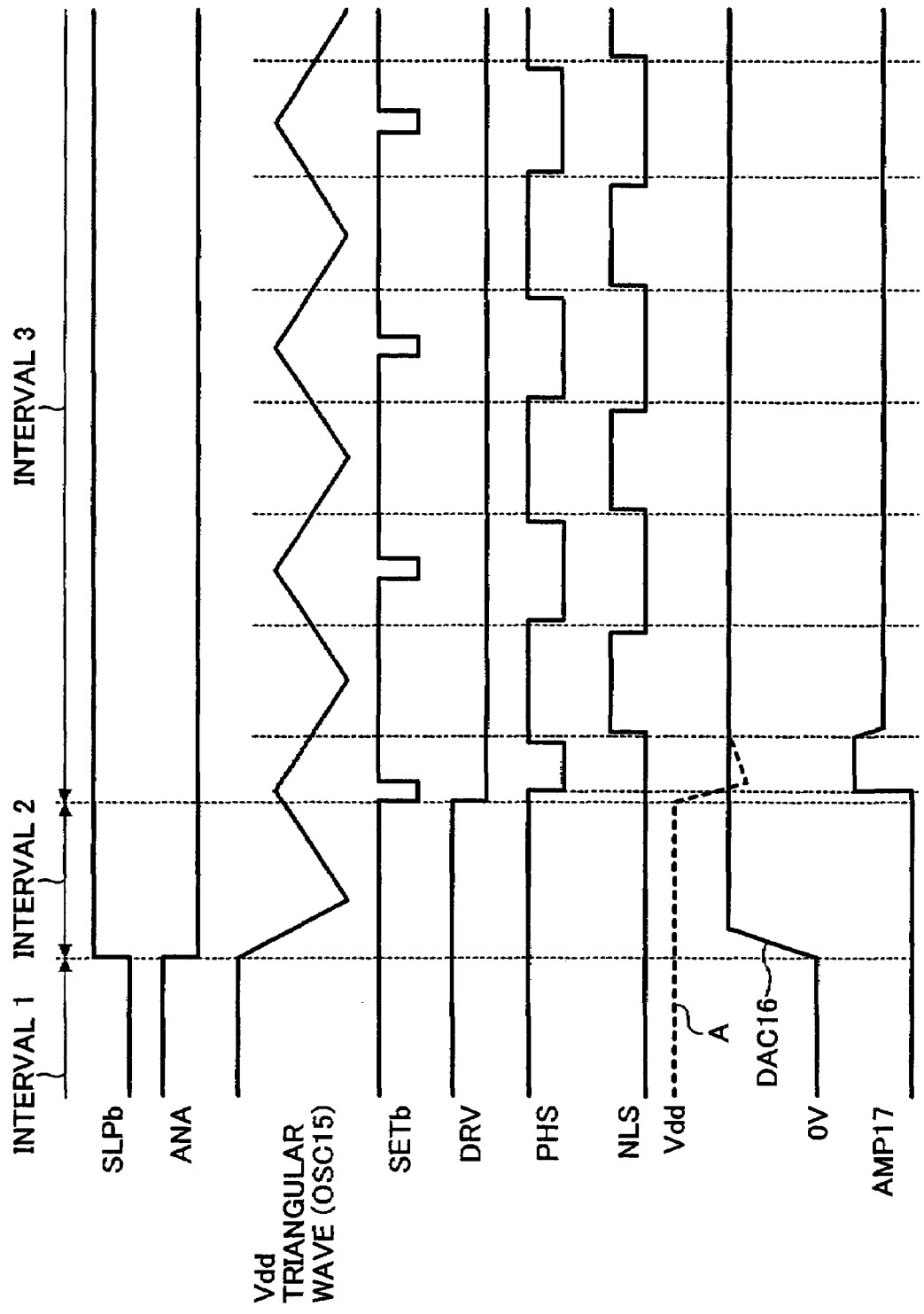
FIG. 3 is a timing diagram illustrating an operation of the DC power supply of FIG. 2.

FIG. 3 is a timing diagram illustrating an operation of the DC power supply of FIG. 2. The components in the circuit of FIG. 2 that are similar to those of the known power supply described earlier in reference to FIG. 1, are shown with identical numerical representations and detailed description thereof is herein abbreviated.

Figure 5:
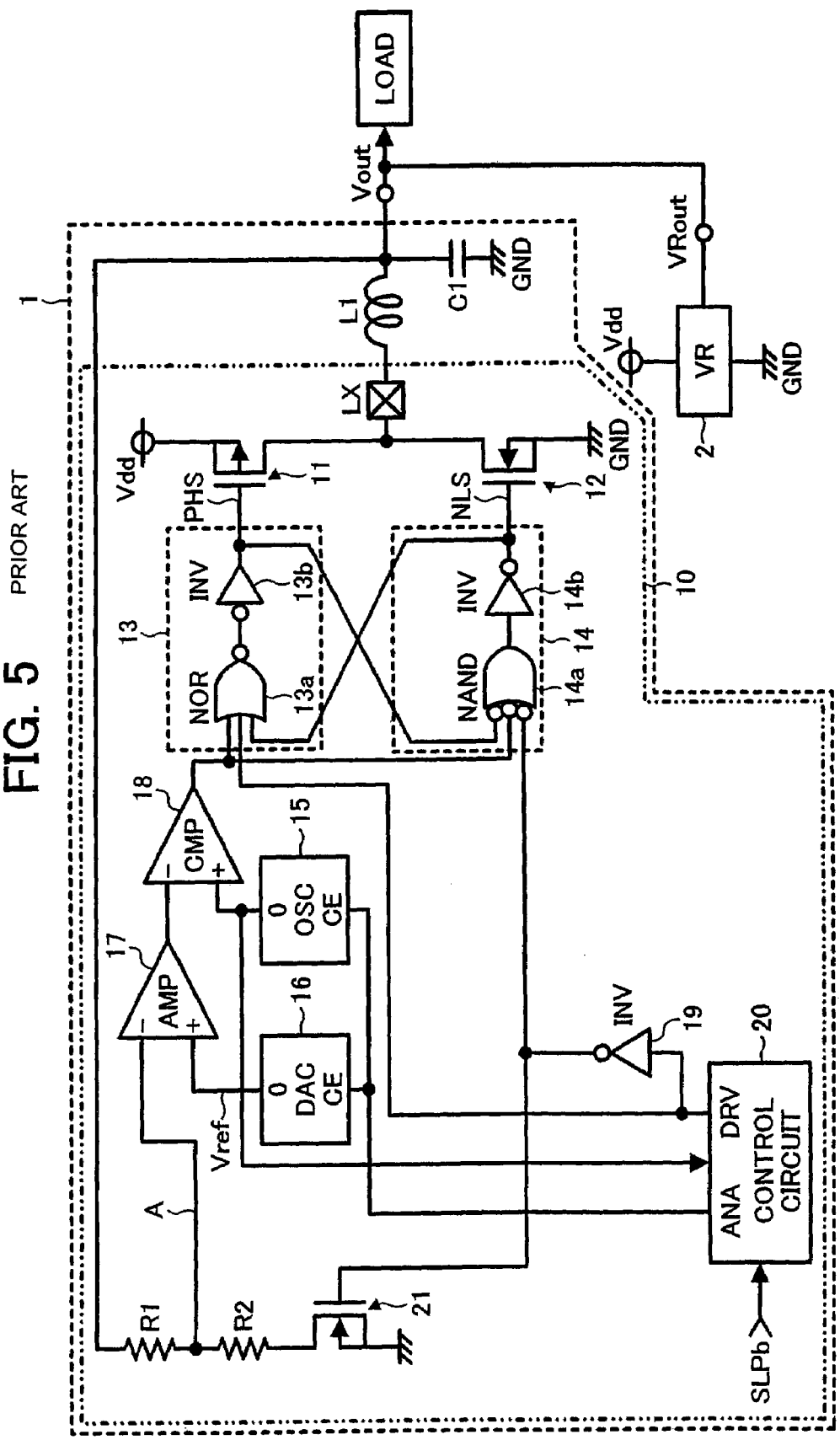
FIG. 5 illustrates a schematic circuit diagram of the stabilized DC current supply previously known.
Figure 6:
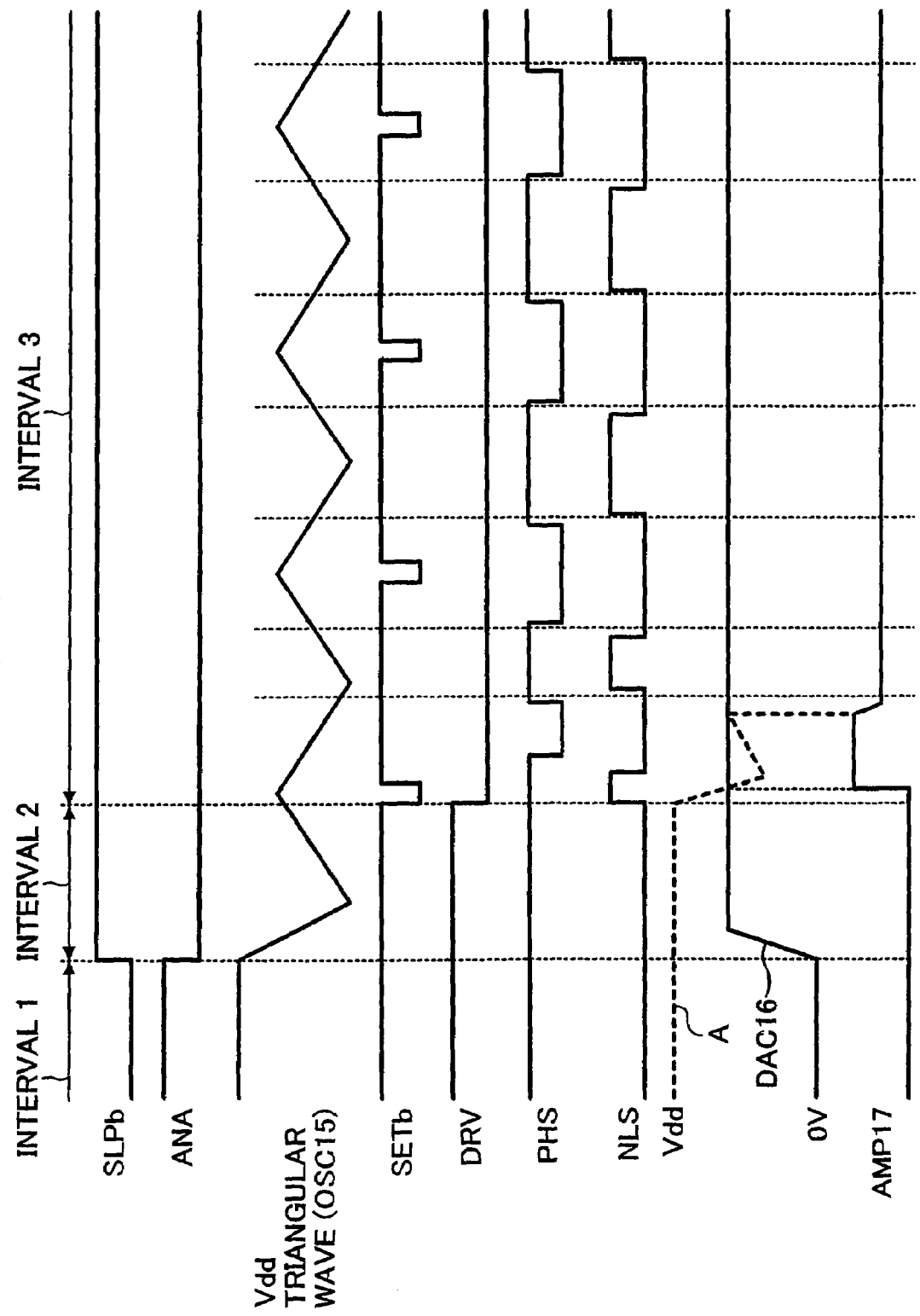
FIG. 6 is a timing diagram illustrating the operation of the switching regulator circuit of FIG. 5.

In contrast to the circuit of FIG. 5, the circuit of FIG. 2 is provided with a latch unit 3 inserted between the second start signal (DRV) and three-input NAND circuit.

This latch unit 3 consists of a logic circuit comprising a NOR circuit 31 and two NOR circuits 34, 35 constituting a latch circuit 3a, and an inverter (INV) 32, and a NOR circuit 33. Namely, the latch circuit 3a of FIG. 1 comprises herein two NOR circuits 34, 35.

To the latch unit 3, the second start signal (DRV) and the gate signal (PHS) are input, while the output from this unit 3 is connected to one of input terminals of the NAND circuit 14a (i.e., the same terminal of the previous circuit of FIG. 5 to which the second start signal is connected).

Namely, the gate signal (PHS) from the first switching element 11 is input to one of input terminals of NOR circuit 31, while the output from the NOR circuit 33 is applied to the other input terminal. And, the output from the NOR circuit 31 is applied to one of input terminals of NOR circuit 34 which constitutes the latch circuit 3a.

To one of input terminals of NOR circuit 35 as the other NOR circuit constituting the latch circuit 3a, the second start signal (DRV) is applied, while the output from NOR circuit 34 NOR circuit 34 is applied to the other input terminal of NOR circuit 35.

The output of NOR circuit 35 is applied to one of input terminals of NOR circuit 33 by way of the inverter (INV) 32, while the second start signal (DRV) is applied to the other input terminal of NOR circuit 33.

The operation of the circuits of FIG. 2 is now described in reference to a timing diagram included in FIG. 3.

The process, in which sleep signals (SLPb) to be bought from the LO level to HI level so that a first start signal (ANA) and second start signal (DRV) are properly output, is essentially the same as that previously described for the known circuit. That is, at the interval (1) at which sleep signals (SLPb) are at LO, the control circuit 20 functions to set both the first start signal (ANA) and the second start signal (DRV) at HI.

During the period of first start signal (ANA) at HI, the operation of both circuits 15, 16 is interrupted, the digital-to-analogue converter (DAC) 16 outputs zero (0) V, and the oscillator circuit (OSC) 15 outputs a source voltage (Vdd).

At the interval (2) where the sleep signals (SLPb) are brought to HI, the control circuit 20 operates immediately to set the first start signal (ANA) at LO.

On receiving the LO start signal, the digital-to-analogue converter (DAC) 16 operates to output the reference voltage (Vref) and the oscillator circuit (OSC) 15 outputs triangular-wave voltages.

In the control circuit 20, synchronization signals (SETb) are then generated in synchronous with the triangular-wave voltages.

Subsequently, in synchronous with the falling tail of the first synchronization signal (SETb) formed right after lifting the sleep mode, the second start signal (DRV) is brought to LO and the operation enters the interval (3).

During the period at which the second start signal (DRV) is HI, since this signal operates to apply a LO level signal to the three-input NAND circuit 14a by way of NOR circuit 33, the gate voltage (NLS) of the second switching element 12 is brought to LO and the second switching element 12 remains to be turned off.

In addition, the second start signal (DRV) is applied also to one of input terminals of NOR circuit 35 constituting the latch circuit 3a, the output of NOR circuit 35 is brought to LO. Since the signal output is subsequently inverted by the inverter (INV) 32 and output to NOR circuit 33, the output of the NOR circuit 33 becomes LO.

As described earlier, the second switching element 12 is maintained as turned off as long as the output of NOR circuit 35 remains LO.

Therefore, even after the second start signal (DRV) becomes LO, the output of NOR circuit 35 constituting the latch circuit 3a is kept LO and the second switching element 12 is maintained in the off-state.

Accordingly, the previously difficulty, in that the second switching element 12 is turned on immediately after the second start signal (DRV) becomes LO and then the power output (Vout) is unintentionally decreased before the switching regulator 1 initiates its normal operation, can be obviated.

When the second start signal (DRV) is brought to LO and operates to turn on the third switching element 21 by way of the inverter (INV) 22, and to couple one end of the resistor (R2) for use in detecting output voltage to the ground, the inverted input voltage (A) of the operational amplifier (AMP) 17 decreases.

Since the output voltage (VRout) from the series regulator 2 is normally set to be slightly lower than the output voltage (Vout) from switching regulator 1, the inverted input voltage (A) to the operational amplifier (AMP) 17 becomes lower than the reference voltage (Vref) output from the digital-to-analogue converter (DAC) 16.

Since the output of the operational amplifier (AMP) 17 is then brought to HI and made higher than the triangular-wave voltage applied to the non-inverting input terminal of the comparator (CMP) 18, the output of comparator (CMP) 18 is brought LO.

Subsequently, the input terminals of the three-input NOR circuit 13a all become LO, the output of the this NOR circuit 13a then becomes HI to be subsequently inverted by the inverter (INV) 13b, and operates to set the gate (PHS) of first switching element 11 to LO. The first switching element 11 is therefore turned on.

The gate (PHS) of first switching element 11 is connected to one of input terminals of NOR circuit 31, while the output of the NOR circuit 33 is connected to the other input terminal.

As described earlier, since the output of the NOR circuit 33 is made LO through the reception of the power output from NOR circuit 35 constituting the latch circuit 3a, the output of the NOR circuit 31 becomes HI when the gate (PHS) of first switching element 11 is made LO.

Since this output of the NOR circuit 31 is connected to the input of NOR circuit 34 included in the latch circuit 3a, the output of the latch circuit 3a is inverted, the output of the NOR circuit 34 then becomes LO, while that of the NOR circuit 35 becomes HI. The output from NOR circuit 35 is inverted by the inverter (INV) 32 and input to one of input terminals of NOR circuit 33.

Since the other input terminal of the NOR circuit 33 is connected to the second start signal (DRV) and two input terminals of the NOR circuit 33 then become both LO, the output of NOR circuit 33 is brought to HI.

The resultant signal makes the gate of the three-input NAND circuit 14a open so as to be able to get the square-wave voltage through. The operation of the switching regulator 1 is therefore initiated.

The DC power supply described herein above in reference to FIG. 2 may also be provided with the DC/DC converter 10 and the series regulator 2 mounted on a single semiconductor integrated circuit 100, and the inductor (L1) and the capacitor (C1) as additional external devices.

EXAMPLE 2

Figure 4:
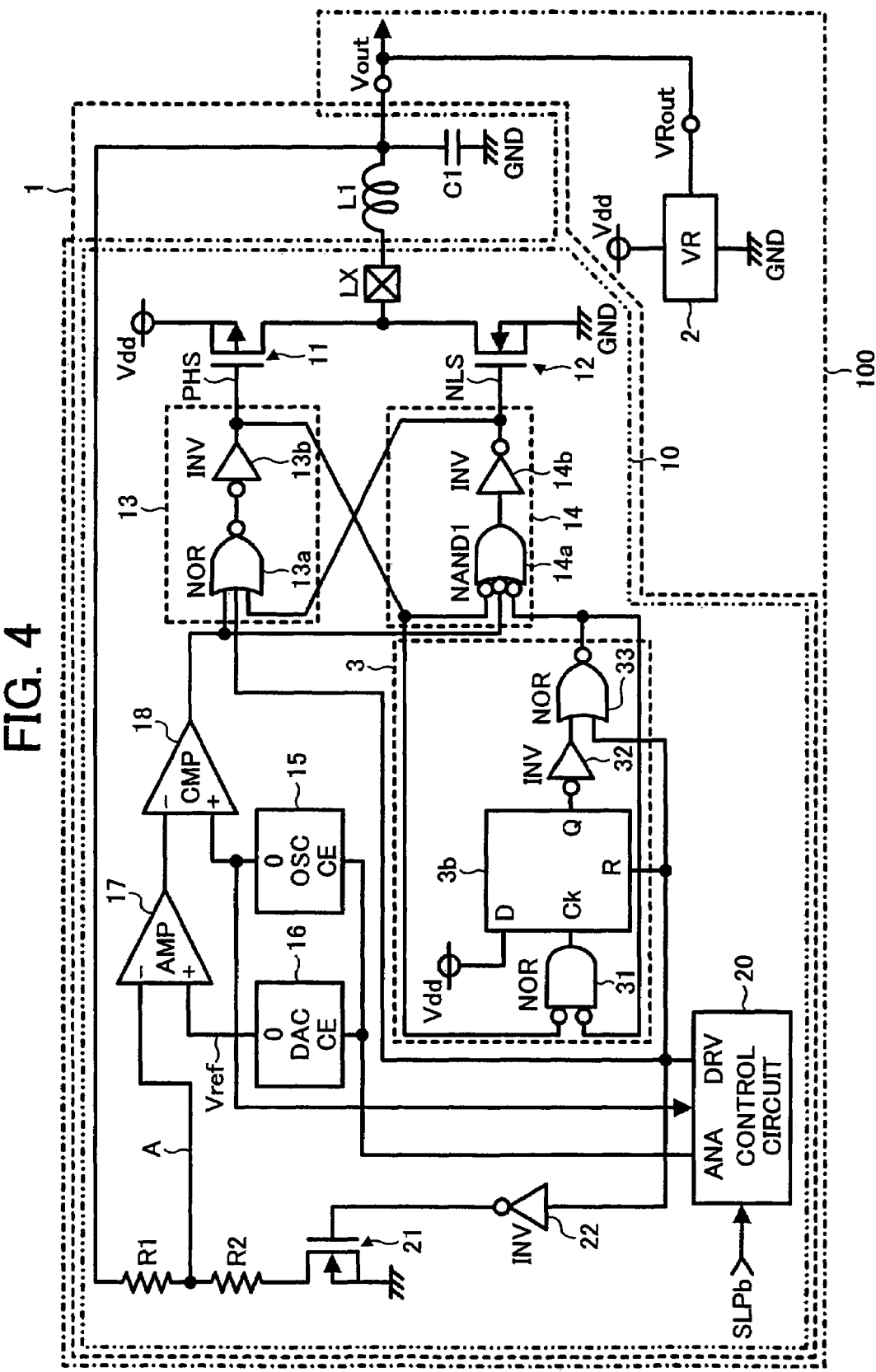
FIG. 4 is a block diagram illustrating the principal operating circuits in a DC power supply according another embodiment of the invention.

FIG. 4 is a block diagram illustrating the principal operating circuits in a DC power supply according an alternate embodiment of the invention, in which the power supply is configured to terminate the operation of a switching regulator during the period at stand-by state or sleep mode, and then switch to a series regulator capable of operating at low current consumption.

In contrast to the circuit of FIG. 3, the circuit of FIG. 4 is provided with a D flip-flop 3b in place of the latch unit 3 mentioned previously.

To the D-terminal of the D flip-flop 3b, a source voltage Vdd is applied, while the output of NOR circuit 31 is applied to clock Ck. In addition, to the reset terminal of D flip-flop 3b, the second start signal (DRV) is applied, and the Q-output of D flip-flop 3b is applied to the inverter (INV) 32.

By constructing the latch circuit using the D flip-flop, the second switching element 12 can be maintained in the off-state if the output of NOR circuit 33 is LO. Therefore, since the Q-output of D flip-flop 3b remains LO even after the second start signal (DRV) becomes LO, the second switching element 12 is maintained in the off-state.

Accordingly, the difficulty noted previously, in that the second switching element 12 is turned on immediately after the second start signal (DRV) becomes LO and then the power output (Vout) is unintentionally decreased, can be obviated.

As described earlier, since the output of the NOR circuit 33 is made LO immediately after the second start signal (DRV) becomes LO through the reception of the output of from Q-output of D flip-flop 3b, the output of the NOR circuit 31 becomes HI when the gate (PHS) of first switching element 11 is made LO.

Since this output of the NOR circuit 31 is applied to the clock terminal Ck of D flip-flop 3b, the output of the D flip-flop 3b latch circuit 3a is inverted to become HI.

The output from D flip-flop 3b is inverted by the inverter (INV) 32 and input to one of input terminals of NOR circuit 33. Since the other input terminal of the NOR circuit 33 is connected to the second start signal (DRV) and two input terminals of the NOR circuit 33 then become both LO, the output of NOR circuit 33 is brought to HI.

The resultant signal makes the gate of the three-input NAND circuit 14a open so as to be able to get the square-wave voltage through. The operation of the switching regulator 1 is therefore initiated.

The DC power supply described herein above in reference to FIG. 4 may also be provided with the DC/DC converter 10 and the series regulator 2 mounted on a single semiconductor integrated circuit 100, and the inductor (L1) and the capacitor (C1) as additional external devices.

It is apparent from the above description including the examples the DC power supplies disclosed herein above can offer several advantages over previously known similar devices and can be incorporated into various circuits and apparatuses.

For example, in the DC power supply adapted to apply a DC voltage to an output terminal, which is output from a system switched selectively between two systems, in which at least one of the two systems comprises a switching regulator.

The switching regulator includes a first switching element and an inductor serially connected between an input terminal for receiving an input voltage and an output terminal, and a second switching element for use in synchronous rectification connected between the first switching element and the ground.

The switching regulator is characterized to convert the input voltage to a predetermined voltage by releasing energy, that is stored in the inductor during on-period of the first switching element, during off-period by way of the second switching element for use in synchronous rectification, and to output the predetermined voltage such that the second switching element is kept turned off until the first switching element is turned on when the operation of the switching regulator is initiated.

In addition, the DC power supply may further include a first drive circuit for driving the first switching element, a second drive circuit for driving the second switching element, and a control circuit for controlling the first and second drive circuits, in which the control circuit is constructed to output a control signal to the first and second drive circuits, and to assume the control based on the control signal such that the second switching element is kept turned off until the first switching element is turned on when an operation of the switching regulator is initiated.

Furthermore, the control circuit is configured to output a start/stop control signal of the switching regulator in response to a sleep signal and transmitted to the first and second drive circuits by way of a latch unit.

Since the second switching element can be kept turned off until the first switching element 11 is turned on when the operation of the switching regulator is initiated, the difficulty noted previously can therefore be obviated, in that the second switching element cannot be turned on unintentionally, and the decrease in power output does not take place before the operation of the switching regulator is initiated.

The advantages noted above are fortified by the method disclosed for driving the DC power supply, including the steps of providing a first switching element, a second switching element, and an inductor; forming a switching regulator as at least one of the two systems by connecting the first switching element and inductor serially between an input terminal for receiving an input voltage and an output terminal, and connecting the second switching element for use in synchronous rectification between the first switching element and the ground; and controlling the switching regulator to convert the input voltage to a predetermined voltage and output the predetermined voltage such that the second switching element is kept turned off until the first switching element is turned on when an operation of the switching regulator is initiated.

In addition, the advantages are also fortified by a semiconductor integrated circuit device to be incorporated into the DC power supply.

The integrated circuit device is formed loading several circuits such as, a DC/DC converter unit included in the switching regulator, including a first switching element, a second switching element for use in synchronous rectification connected between the first switching element and the ground, a first drive circuit for driving the first switching element, a second drive circuit for driving the second switching element, and a control circuit for controlling the first and second drive circuits; and the series regulator; in which the control circuit is configured to assume a control such that the second switching element is kept turned off until the first switching element is turned on when the operation of the switching regulator is initiated.

The process steps set forth in the present description on the construction of, and the method of driving DC power supply may be implemented using conventional general purpose microprocessors, programmed according to the teachings in the present specification, as will be appreciated to those skilled in the relevant arts. Appropriate software coding can readily be prepared by skilled programmers based on the teachings of the present disclosure, as will also be apparent to those skilled in the relevant arts.

The present specification thus include also a computer-based product Which may be hosted on a storage medium, and include instructions which can be used to program a microprocessor to perform a process in accordance with the present disclosure. This storage medium can include, but not limited to, any type of disc including floppy discs, optical discs, CD-ROMs, magneto-optical discs, ROMs, RAMs, EPROMs, EEPROMs, flash memory, magnetic or optical cards, or any type of media suitable for storing electronic instructions.

Additional modifications and variations of the present invention are possible in light of the above teachings. It is therefore to be understood that within the scope of the appended claims, the invention may be practiced other than as specifically described herein.

What is claimed is:

1. A DC (direct current) power supply configured to apply a DC voltage to an output terminal, said DC voltage being output from a system switched selectively between two systems, wherein at least one of said two systems comprises a switching regulator comprising:
   a first switching element and an inductor serially connected between an input terminal for receiving an input voltage and an output terminal;
   a second switching element for use in synchronous rectification connected between said first switching element and the ground,
   wherein said switching regulator is configured to convert the input voltage to a predetermined voltage by releasing energy, that is stored in the inductor during on-period of said first switching element, during off-period of said first switching element by way of said second switching element for use in synchronous rectification, and to output the predetermined voltage such that said second switching element is kept turned off until said first switching element is turned on when an operation of said switching regulator is initiated;
   a first drive circuit for driving said first switching element;
   a second drive circuit for driving said second switching element, said second drive circuit coupled to said first drive circuit; and
   a control circuit for controlling said first and second drive circuits, wherein said control circuit is configured to output a first control signal to said first and second drive circuits, and to assume a control based on the first control signal such that said second switching element is kept turned off until said first switching element is turned on partially based on a signal received by said second drive circuit from said first drive circuit when an operation of said switching regulator is initiated.

2. The DC power supply according to claim 1, wherein the first control signal is a start/stop control signal of said switching regulator in response to a sleep signal.

3. The DC power supply according to claim 2, wherein the first control signal is transmitted to said second drive circuit by way of a latch unit.

4. The DC power supply according to claim 3, wherein the first control signal by way of said latch unit is input to a control electrode of said second switching element, wherein said latch unit operates to latch a signal derived from the first control signal for putting said switching regulator into a halt mode so that said second switching element is maintained in a off-state, and wherein said latch circuit is lifted by a signal for turning on said first switching element.

5. The DC power supply according to claim 4, wherein said signal for turning on said first switching element so that said latch unit is lifted is a gate signal from said first switching element.

6. The DC power supply according to claim 1, wherein the first control signal is transmitted to said second drive circuit by way of a latch unit.

7. The DC power supply according to claim 6, wherein the first control signal by way of said latch unit is input to a control electrode of said second switching element, wherein said latch unit operates to latch a signal derived from the first control signal for putting said switching regulator into a halt mode so that said second switching element is maintained in a off-state, and wherein said latch circuit is lifted by a signal for turning on said first switching element.

8. The DC power supply according to claim 7, wherein said signal for turning on said first switching element so that said latch unit is lifted is a gate signal from said first switching element.

9. A semiconductor integrated circuit device for use in a DC (direct current) power supply configured to apply a DC voltage to an output terminal by selectively switching between a first voltage from a switching regulator and a second voltage from a series regulator, comprising:
   a DC/DC converter unit included in said switching regulator, comprising:
   a first switching element;
   a second switching element for use in synchronous rectification connected between said first switching element and the ground;
   a first drive circuit for driving said first switching element;
   a second drive circuit for driving said second switching element; and
   a control circuit for controlling said first and second drive circuits, and
   said series regulator,
   wherein said control circuit is configured to assume a control such that said second switching element is kept turned off until a signal is received from said first driver circuit indicating that said first switching element is turned on when an operation of said switching regulator is initiated.

10. A DC power supply configured to apply a DC voltage to an output terminal, said DC voltage being output from one means switched selectively between two means, wherein at least one of said two means comprises a switching regulator means comprising:
   first means for switching and an inductor serially connected between an input terminal for receiving an input voltage and an output terminal;
   second means for switching for use in synchronous rectification connected between said first switching element and the ground,
   wherein said switching regulator means is configured to convert the input voltage to a predetermined voltage by releasing energy, that is stored in the inductor during on-period of said first means for switching, during off-period of said first means for switching by way of said second means for switching for use in synchronous rectification, and to output the predetermined voltage such that said second means for switching is kept turned off until a first signal is received indicating that said first means for switching is turned on when an operation of said switching regulator means is initiated;
   first means for driving for driving said first switching element;
   second means for driving for driving said second switching element; and
   means for controlling for controlling said first and second means for drive circuits, wherein said means for controlling is configured to output a first control signal to said first and second means for driving, and to assume a control based on the control signal such that said second means for switching is kept turned off until said first means for switching is turned on when an operation of said switching regulator means is initiated, wherein the second control signal is transmitted to said first and second means for driving by way of a latch means, wherein the second control signal by way of said latch means is input to a control electrode of said second switching element, wherein said latch means operates to latch a signal derived from the control signal for putting said switching regulator means into a halt mode so that said second means for switching is maintained in a off-state, and wherein said latch means is lifted by a signal for turning on said first means for switching.

11. The DC power supply according to claim 10, wherein said signal for turning on said first means for switching so that said latch means is lifted is a gate signal from said first means for switching.

12. A semiconductor integrated circuit device for use in a DC power supply configured to apply a DC voltage to an output terminal by selectively switching between a first voltage from switching regulator means and a second voltage from series regulator means, comprising:

DC/DC converter means included in said switching regulator means, comprising:

first means for switching;

second means for switching for use in synchronous rectification connected between said first means for switching and the ground;

first means for driving said first means for switching;

second means for driving said second means for switching, said second means coupled to an output of said first means; and means for controlling said first and second means for driving, and said series regulator means, wherein said means for controlling is configured to assume a control such that said second means for switching is kept turned off until said first means for switching is turned on, depending on a signal received by said second means from said first means, when an operation of said switching regulator means is initiated.

* * * * *